(12) United States Patent
Menon et al.

(10) Patent No.: US 12,513,303 B2
(45) Date of Patent: Dec. 30, 2025

(54) VIDEO ENCODING COMPLEXITY PREDICTOR

(71) Applicant: Bitmovin GmbH, Klagenfurt am Wörthersee (AT)

(72) Inventors: Vignesh V. Menon, Klagenfurt am Wörthersee (AT); Hadi Amirpour, Klagenfurt am Wörthersee (AT); Christian Timmerer, Klagenfurt am Wörthersee (AT)

(73) Assignee: Bitmovin GmbH, Klagenfurt am Wörthersee (AT)

( * ) Notice: Subject to any disclaimer, the term of this patent is extended or adjusted under 35 U.S.C. 154(b) by 60 days.

(21) Appl. No.: 18/371,830

(22) Filed: Sep. 22, 2023

(65) Prior Publication Data

US 2024/0121400 A1 Apr. 11, 2024

Related U.S. Application Data

(60) Provisional application No. 63/409,304, filed on Sep. 23, 2022.

(51) Int. Cl.
*H04N 11/02* (2006.01)
*G06V 10/44* (2022.01)
(Continued)

(52) U.S. Cl.
CPC ............. *H04N 19/14* (2014.11); *G06V 10/44* (2022.01); *G06V 10/60* (2022.01); *G06V 10/82* (2022.01); *H04N 19/124* (2014.11)

(58) Field of Classification Search
CPC ...... H04N 19/14; H04N 19/124; G06V 10/60; G06V 10/82; G06V 10/44
(Continued)

(56) References Cited

U.S. PATENT DOCUMENTS 10,104,413 B2    10/2018  Phillips et al.
10,419,773 B1 *   9/2019  Wei ......................... H04N 19/46
(Continued)

OTHER PUBLICATIONS

Bentaleb et al., "A Survey on Bitrate Adaptation Schemes for Streaming Media Over HTTP,", IEEE Communications Surveys & Tutorials, vol. 21, No. 1, 2019, pp. 562-585.
(Continued)

*Primary Examiner* — Jayanti K Patel
*Assistant Examiner* — Richard B Carter
(74) *Attorney, Agent, or Firm* — Marton Ribera Schumann & Chang LLP; Chien-Ju Alice Chuang

(57) ABSTRACT

Techniques for predicting video encoding complexity are described herein. A method for predicting video encoding complexity includes performing video complexity feature extraction on a video segment to extract low-complexity frame-based features, predicting video encoding complexity for the video segment using the low-complexity frame-based features, and outputting a predicted encoding bitrate and a predicted encoding time. An embodiment may include implementing a hybrid model using a CNN, wherein a latent vector from a frame of the video segment is extracted and also may be used to predict video encoding complexity. The predicted encoding bitrates and encoding times may be provided to encoding infrastructure for use in optimizing a schedule of encodings.

14 Claims, 4 Drawing Sheets

(51) Int. Cl.
*G06V 10/60* (2022.01)
*G06V 10/82* (2022.01)
*H04N 19/124* (2014.01)
*H04N 19/14* (2014.01)

(58) Field of Classification Search
USPC .................................................. 375/240.12
See application file for complete search history.

(56) References Cited

U.S. PATENT DOCUMENTS

| | | | |
|---|---|---|---|
| 10,499,081 | B1 | 12/2019 | Wang et al. |
| 10,798,399 | B1* | 10/2020 | Wei .................. H04N 19/132 |
| 10,958,947 | B1* | 3/2021 | Wei .................. H04N 21/236 |
| 11,445,168 | B1* | 9/2022 | Wei .................. H04N 17/00 |
| 2005/0018881 | A1 | 1/2005 | Peker et al. |
| 2010/0189183 | A1 | 7/2010 | Gu et al. |
| 2011/0305273 | A1 | 12/2011 | He et al. |
| 2012/0147958 | A1 | 6/2012 | Ronca |
| 2013/0089142 | A1 | 4/2013 | Begen et al. |
| 2013/0282917 | A1 | 10/2013 | Reznik et al. |
| 2016/0073106 | A1 | 3/2016 | Su |
| 2016/0134881 | A1 | 5/2016 | Wang |
| 2017/0078574 | A1 | 3/2017 | Puntambekar et al. |
| 2017/0078686 | A1 | 3/2017 | Coward et al. |
| 2018/0014050 | A1 | 1/2018 | Phillips et al. |
| 2018/0338146 | A1 | 11/2018 | John |
| 2019/0028745 | A1 | 1/2019 | Katsavounidis |
| 2019/0075301 | A1 | 3/2019 | Chou et al. |
| 2019/0132591 | A1 | 5/2019 | Zhang et al. |
| 2019/0289296 | A1 | 9/2019 | Kottke et al. |
| 2020/0412784 | A1 | 12/2020 | Yamagishi et al. |
| 2023/0012862 | A1 | 1/2023 | Kossentini et al. |

OTHER PUBLICATIONS

Jain et al., "Throughput Fairness Index: An Explaination", 1984, p. -13.
Mehrabi et al., "Edge Computing Assisted Adaptive Mobile Video Streaming", IEE Transactions on Mobile Computing, vol. 18, No. 4, Apr. 2019, pp. 787-800.
Lederer et al., "Dynamic Adaptive Streaming over HTTP Dataset", Proceedings of the 3rd Multimedia Systems Conference, Feb. 2012, pp. 89-94.
Ericsson, "Ericsson Mobility Report", Nov. 2019, pp. 1-36.
ETSI, "Mobile Edge Computing A Key Technology Towards 5G", ETSI White Paper No. 11, Sep. 2015, pp. 1-16.
Nguyen et al., "Adaptation Method for Video Streaming over HTTP/2", IEICE Communications Express Comex, vol. 1, pp. 1-6, https://www.researchgate.netpublication/292213198_Adaptation_Method_for_Video_Streaming_over_HTTP2).
3GPP "3GPP TS 26.247. Progressive Download and Dynamic Adaptive Streaming over HTTP (3GP-DASH)", 2015, pp 1, https://portal.3gpp.org/desktopmodules/Specifications/SpecificationDetails.aspx?specificationId=1444.
Gernot Zwantschko, "What is Per-Title Encoding? How to Efficiently Compress Video", BITMOVIN, pp. 1-14, https://bitmovin.com/per-title-encoding/.
V.V Menon et al., "Efficient Content-Adaptive Feature-Based Shot Detection for HTTP Adaptive Streaming" IEEE, May 20, 2021, pp. 1-2, https://www.youtube.com/watch?v=jkA1R0shpTc.
Liu et al., "Video Super-Resolution Based on Deep Learning: A Comprehensive Survey", arXiv:2007.12928v3 [cs.CV], Mar. 16, 2022, pp. 1-33.
Jon Dahl, "Instant Per-Title Encoding", MUX, Apr. 17, 2018, pp. 1-8, https://mux.com/blog/instant-per-title-encoding/.
Ledig et al., "Photo-Realistic Single Image Super-Resolution Using a Generative Adversarial Network", arXiv:1609.04802, May 25, 2017, pp. 1-19, http://arxiv.org/abs/1609.04802.
Mishra et al., "A Survey on Deep Neural Network Compression: Challenges, Overview, and Solutions", arXiv:2010.03954, Oct. 5, 2020, pp. 1-19, https://arxiv.org/abs/2010.03954.
Li et al., "Toward A Practical Perceptual Video Quality Metric", Netflix Technology Blog, Jun. 5, 2016, pp. 1-23, https://netflixtechblog.com/toward-a-practical-perceptual-video-quality-metric-653f208b9652.
Menon et al., "ETPS: Efficient Two-pass Encoding Scheme for Adaptive Live Streaming," Athena, https://www.youtube.com/watch?v=-pb3VJtrBN4, Oct. 16-19, 2022, pp. 1-2.
Sullivan et al., "Overview of the High Efficiency Video Coding (HEVC) Standard," IEEE Transactions on Circuits and Systems for Video Technology, vol. 22, No. 12, Dec. 2012, pp. 1649-1668.
Chen et al., "XGBoost: A Scalable Tree Boosting System," Machine Learing, Mar. 2016, pp. 785-794.
Huangyuan et al., "Performance Evaluation of H.265/MPEG-HEVC Encoders for 4K Video Sequences," APSIPA, 2014, pp. 1-8.
Ioffe et al., "Batch Normalization: Accelerating Deep Network Training by Reducing Internal Covariate Shift," arXiv:1502.03167, Mar. 2015, pp. 1-11.
Zvezdakov et al., "Machine-Learning-Based Method for Content-Adaptive Video Encoding," IEEE Xplore, 2021, pp. 1-5.
Intel Corporation, "Accelerating x265 with Intel Advanced Vector Extensions 512" White Paper, Mar. 2018, pp.
Cisco, "Cisco Annual Internet Report (2018-2023) White Paper," Mar. 2020, pp.

* cited by examiner

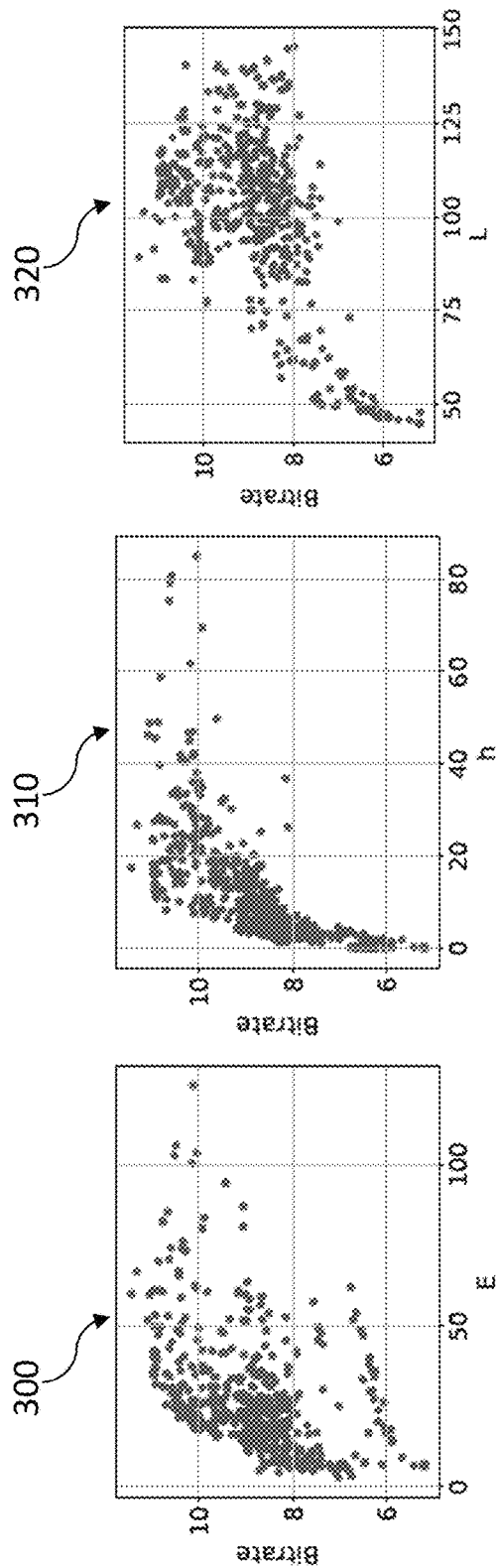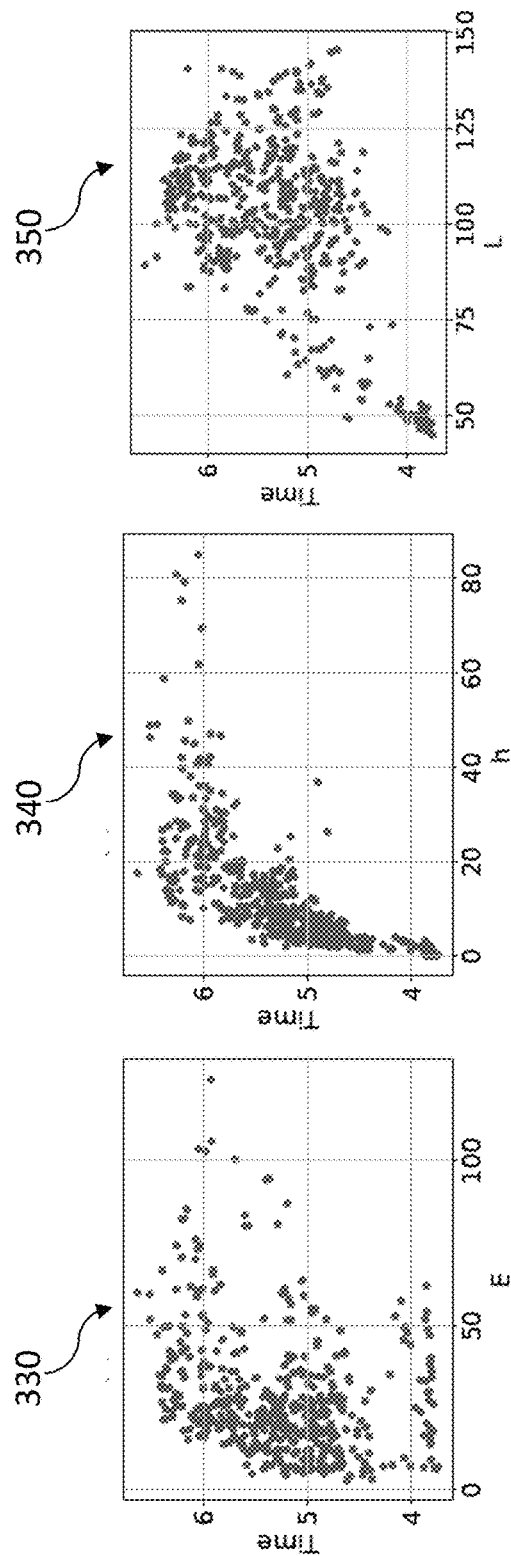
FIGURE 3A
FIGURE 3B

VIDEO ENCODING COMPLEXITY PREDICTOR

CROSS-REFERENCE TO RELATED APPLICATIONS

This application claims priority to U.S. Provisional Patent Application No. 63/409,304 entitled "Video Encoding Complexity Predictor," filed Sep. 23, 2022, the contents of which are hereby incorporated by reference in their entirety.

BACKGROUND OF INVENTION

The increasing demand for high-quality and low-cost video streaming services calls for the prediction of video encoding complexity. Video consists of a major share of Internet traffic, and it is expected to grow. HTTP Adaptive Streaming (HAS) plays a key role in increasing demand for video content since it provides a de-facto framework to deliver high-quality live and Video on Demand (VoD) video streams. In HAS, each video asset is divided into segments and each segment is provided in multiple versions (i.e., representations) to increase the compatibility with the end-user's network condition and device type. To deliver more immersion to end-users, videos are evolving in various aspects, including spatial resolution (towards 8K), temporal resolution (towards high framerate videos), dynamic range (towards high dynamic range), etc.

In HAS, encoding at scale introduces inherent challenges with respect to content provisioning and requires multiple parameters to be set in order to deliver video streams efficiently. To enable fast video encoding, streaming service provider companies utilize large data centers and deploy the encoding tasks using opportunistic load balancing (OLB) algorithms to keep the processing core utilized at all times, as shown in prior art FIG. 1. Generally, such systems use various scheduling algorithms to attempt to maximize the use of processing units and minimize the encoding time of video segments. For example, as shown in diagram 100, encoding time scheduling 106 may rely on predictions by encoding time prediction 104 to maximize the use of processing units and minimize encoding time for video segment 102. Optimizing massive encodings over multiple instances considering encoding time and the price of instances results in a significant encoding cost reduction. However, a problem arises when a simple scheduling algorithm randomly assigns several and very complex encodings to a single computing unit, leading to a load imbalance and a degradation of video quality on the viewer side or to an increase in expenses.

Many existing techniques involve transcoding time prediction where the prediction is carried out after a first-pass initial analysis. Some provide mechanisms for allocation and deallocation of virtual machines (VMs) to a cluster of video transcoding servers in a horizontal fashion, which uses a two-step load prediction method allowing proactive resource allocation with high prediction accuracy under real-time constraints. Others present a method for predicting the transcoding time of videos given an input video stream and its transcoding parameters. Video transcoding time is treated as a random variable and is statistically predicted form past observations. This approach also is proposed to predict the transcoding time of a video into another given transcoding parameters and an input video using bitrate, framerate, resolution, the number and size of I, P, and B frames of the given encoded video. However, these parameters are not available for an uncompressed video. Still others use the transcoding time of the previous group of pictures (GOPs) to predict the transcoding time of the current GOP.

To avoid two-pass analysis, which introduces significant latency and additional computational overhead, techniques have been proposed to extract features from videos with which the behavior of the encoding system could be modeled. Spatial information and temporal information are popular features traditionally used to represent the complexity of a video sequence. Videos are classified into four groups using their spatial and temporal information values. However, since calculating spatial and temporal information values is a time-consuming process for high-resolution videos, they are typically transcoded first with a low bitrate (i.e., 100 kbps) and a low resolution (i.e., 144 p) using the ultrafast preset, which takes, on average, 1.07 s for 2 s segments. The spatial and temporal information values are then calculated using the transcoded video. The video complexity class in addition to some of its features is fed to an artificial neural network (ANN) to predict the encoding time complexity. The spatial and temporal complexity features are used to predict each video content's encoding runtime and optimize instances (such as Amazon Elastic Computing (e.g., EC2) spot instances) and minimize video encoding costs. A rate-distortion model has been developed for real-time scalable video coding based on spatio-temporal features. In the context of QoE spatial-temporal features are widely used for quality estimation. In predicting encoding parameters also, spatio-temporal features are broadly used, for example, in adaptive streaming applications to determine optimized resolution, optimized framerate, other relevant encoding parameters, and even to determine the compressibility (i.e., quality of a video at a certain bitrate) of video sources. However, none of these techniques show a high predictive value for video encoding complexity. They also compute spatio-temporal features at a rate of 0.2 seconds per frame (i.e., 5 frames per second (fps)) for UHD resolution and 0.05 seconds per frame (i.e., 20 fps) for Full HD (i.e., 1080 p) resolution, which is unsuitable for live video streaming applications, which require encoding speeds in the order of 60 fps or faster (e.g., for Ultra HD 60 fps sequences).

Therefore, a video encoding complexity predictor to provide encoding infrastructure with prior information on encoding times is desirable.

BRIEF SUMMARY

The present disclosure provides techniques for a video encoding complexity predictor. A method for predicting video encoding complexity may include: performing video complexity feature extraction on a video segment, wherein a plurality of low-complexity frame-based features are extracted; predicting video encoding complexity for the video segment using the plurality of low-complexity frame-based features, a predicted video encoding complexity comprising an encoding bitrate and an encoding time; and outputting a predicted encoding bitrate and a predicted encoding time. In some examples, the plurality of low-complexity frame-based features comprises a Discrete Cosine Transform-energy-based feature. In some examples, the plurality of low-complexity frame-based features includes one, or a combination, of a spatial energy feature (E), an average temporal energy (h), and a luma brightness (L). In some examples, predicting video encoding complexity comprises implementing a linear regression model. In some examples, predicting video encoding complexity comprises implementing a gradient boosting regression model.

In some examples, predicting video encoding complexity comprises implementing a hybrid model using a convolutional neural network (CNN).

In some examples, the method also includes extracting a latent vector from a frame of the video segment using the CNN. In some examples, the latent vector is further used as input for predicting video encoding complexity. In some examples, the CNN comprises a fully connected layer as a penultimate layer.

In some examples, the method also includes providing one or both of the predicted encoding bitrate and the predicted encoding time to an encoding infrastructure. In some examples, the method also includes optimizing a schedule of encodings using one or both of the predicted encoding bitrate and the predicted encoding time. In some examples, the method also includes providing an encoder type as input for predicting video encoding complexity, the encoder type indicating a codec. In some examples, the method also includes providing a target quantization parameter (QP) as input for predicting video encoding complexity. In some examples, the method also includes providing a central processing unit (CPU) resource as input for predicting video encoding complexity.

A distributed computing system may include: a distributed database configured to store a plurality of video segments, a convolutional neural network (CNN), a plurality of bitrate ladders, and a codec; and one or more processors configured to: perform video complexity feature extraction on a video segment, wherein a plurality of low-complexity frame-based features are extracted; predict video encoding complexity for the video segment using the plurality of low-complexity frame-based features, a predicted video encoding complexity comprising an encoding bitrate and an encoding time; and output a predicted encoding bitrate and a predicted encoding time. In some examples, the CNN in the distributed computing system comprises a fully connected layer as a penultimate layer.

A system for content-adaptive encoder preset prediction for adaptive live streaming, the system comprising: a processor; and a memory comprising program instructions executable by the processor to cause the processor to implement: perform video complexity feature extraction on a video segment, wherein a plurality of low-complexity frame-based features are extracted; predict video encoding complexity for the video segment using the plurality of low-complexity frame-based features, a predicted video encoding complexity comprising an encoding bitrate and an encoding time; and output a predicted encoding bitrate and a predicted encoding time. In some examples, the system also includes a convolutional neural network (CNN). In some examples, the CNN in the system comprises a fully connected layer as a penultimate layer.

BRIEF DESCRIPTION OF THE DRAWINGS

Various non-limiting and non-exhaustive aspects and features of the present disclosure are described hereinbelow with references to the drawings, wherein:

FIG. 3A is series of scatterplots illustrating encoding bitrates as a function of various features extracted in an exemplary video encoding complexity prediction framework, in accordance with one or more embodiments.

FIG. 3B is a series of scatterplots illustrating encoding times as a function of various features extracted in an exemplary video encoding complexity prediction framework, in accordance with one or more embodiments.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The invention is directed to a video encoding complexity prediction technique. The proposed lightweight video encoding complexity scheme predicts the encoding complexity (e.g., encoding bitrate and encoding time) of video content with high accuracy. Such accurate prediction of encoding time complexity of videos can be used for efficient resource utilization (e.g., scheduling) in the cloud by providing the encoding infrastructure with prior information on the encoding times of various video encoding tasks to ensure their fast completion with a good load balance.

In some examples, low-complexity Discrete Cosine Transform (DCT)-energy-based features, namely spatial complexity, temporal complexity, and brightness of videos are extracted, which can efficiently represent the encoding complexity of videos. Latent vectors may also be extracted using a convolutional neural network (CNN) (e.g., using MobileNet as a backend) to obtain additional features from representative frames of each video to assist with the prediction process. An extreme gradient boosting regression algorithm (e.g., XGBoost) may be deployed to predict video encoding complexity using extracted features. In some examples, this complexity prediction scheme can predict encoding bitrate and encoding time with very low error percentages (e.g., <4% encoding bitrate errors, <3% encoding time errors, or less), while still minimizing overall latency per frame (e.g., 3.5 ms/frame or less). This complexity prediction scheme is suitable for both Video on Demand (VoD) and live streaming applications.

Figure 1:
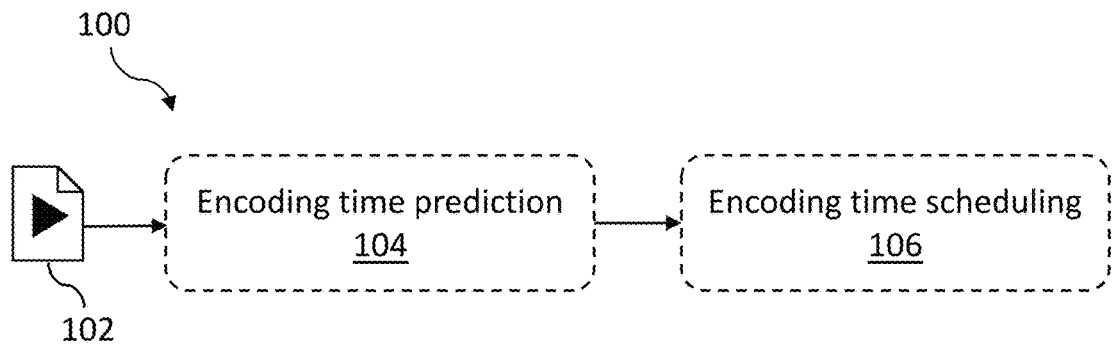
FIG. 1 is a flow diagram illustrating an exemplary prior art encoding scheduling in large data centers.
Figure 2:
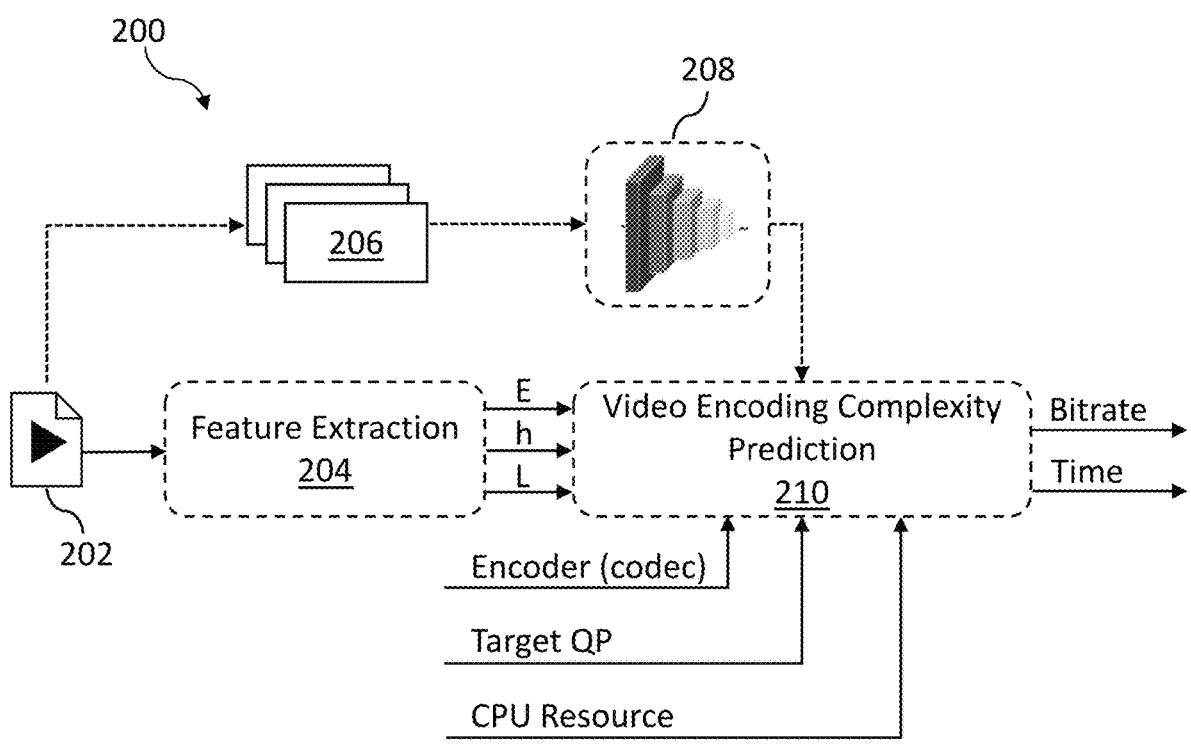
FIG. 2 is a simplified block diagram of an exemplary video encoding complexity prediction framework, in accordance with one or more embodiments.

In HAS, the same video content is encoded at multiple bitrate-resolution pairs (i.e., a bitrate ladder) to adapt to the end-users' network conditions. Per-title encoding approaches have been introduced to optimize bitrate ladder construction. Optimizations considering the encoding bitrate (e.g., predicting the encoding bitrate for each quantization parameter (QP)) enhance Qality of Experience (QoE). A video encoding complexity prediction system can predict encoding bitrate and encoding time for each video and video segment for a givent target quality and target video codec/ encoding with minimum prediction error. Light-weight video complexity features (e.g., spatio-temporal characteristics) are extracted to predict the encoding complexity, including an encoding bitrate and an encoding time. DCT-based features that highly correlate with video encoding complexity are analyzed and used for prediction as shown in FIG. 2 and described herein. In an example described herein, a gradient boosting regression algorithm (e.g., XGBoost) with various input feature combinations, including image features latent vectors, may be used in encoding bitrate and encoding time prediction models.

FIG. 2 is a simplified block diagram of an exemplary video encoding complexity prediction framework, in accordance with one or more embodiments. Framework 200 illustrates two phases of a video encoding complexity prediction framework: (i) video complexity feature extraction, and (ii) encoding complexity prediction. In some examples, three DCT-energy-based features may be used to represent brightness, spatial, and temporal complexity measures: (i) average luma brightness L, (ii) average texture energy E, and (iii) average gradient of the texture energy h, respectively. For example, the first phase may comprise feature extraction 204, which include extracting features from video segment 202, including, but not limited to, an average luma brightness L, average texture energy E, and average gradient of the texture energy h. E, h, and L may be input as parameters for video encoding complexity prediction 210. Video encoding complexity prediction 210 may comprise predicting an encoding bitrate and an encoding time using the features extracted in feature extraction 204. Other parameters that may be input to video encoding complexity prediction 210 may include an encoder codec type, a target quantization parameter (QP), and a central processing unit (CPU) resource. In some embodiments, a pre-trained CNN 208 may be used to extract latent vectors from video frames 208, which may be derived from video segment 202, as described herein.

Video Complexity Feature Extraction

A DCT-based energy function may be introduced to determine the texture of each non-overlapping block in each frame p, which may be defined as:

$$H_{p,k} = \sum_{i=0}^{w-1}\sum_{j=0}^{h-1} e^{\left(\frac{ij}{w^2}\right)^2 - 1} |DCT(i,j)|$$

where w×w pixels is the size of the block, and DCT(i,j) is the (i,j)$^{th}$ DCT component when i+j>0, and 0 otherwise. Exponentially higher costs may be assigned to higher DCT frequencies since it is expected that a mixture of objects causes higher frequencies. The texture is averaged to determine the spatial energy feature denoted as E, which may be defined as:

$$E = \sum_{k=0}^{n-1} \frac{H_{p,k}}{n \cdot w^2}$$

Here, n represents a number of blocks per frame. Furthermore, the block-wise SAD of the texture energy of each frame compared to its previous frame may be computed to obtain an average temporal energy (h), which may be defined as:

$$h = \sum_{k=0}^{n-1} \frac{|H_{p,k} - H_{p-1,k}|}{n \cdot w^2}$$

The luma brightness (i.e., luminescence) of non-overlapping blocks of each frame p may be defined as:

$$L_{p,k} = \sqrt{DCT(0,0)}$$

where DCT (0,0) is the DC component in the DCT calculation and k is the block address in the p$^{th}$ frame. The block-wise luma brightness is averaged per frame to obtain the average luma brightness per frame L as shown below:

$$L = \sum_{k=0}^{n-1} \frac{L_{p,k}}{n \cdot w^2}$$

Encoding Complexity Prediction

The input features (e.g., E, h, and L extracted by feature extraction 204) may be used to predict an encoding bitrate and an encoding time. Other parameters passed as input to the model may include the encoder (i.e., codec) type, target QP, and CPU resource used for encoding, as shown in FIG. 2. Prediction models that may be used include a linear regression model, an XGBoost model, and a hybrid model.

In an example, a linear regression model may be implemented as a simple model to fit data as a baseline model. Outputs of an exemplary linear regression model may show the relationship between outcomes, including encoding bitrate and encoding time (e.g., in logarithm scale), and features E, h, and L as shown in FIGS. 3A-3B. FIG. 3A is series of scatterplots illustrating encoding bitrates as a function of various features extracted in an exemplary video encoding complexity prediction framework, in accordance with one or more embodiments. FIG. 3B is a series of scatterplots illustrating encoding times as a function of various features extracted in an exemplary video encoding complexity prediction framework. In these examples, charts 300-350 represent encoding bitrate's and encoding time's, respectively, dependency on E, h, and L features. In some examples, the average values of these input features may be used as input to a linear regression model.

In another example, a gradient boosting regression algorithm (e.g., XGBoost) may be used as an implementation of the boosting approach in ensemble learning. XGBoost has several advantages such as regularization to prevent overfitting, the possibility of parallel learning, and a reduction of uncertainty using ensemble learners. Furthermore, XGBoost is effective when dealing with tabular data due to the ensemble architecture as the model reduces uncertainty with each of its learners exploring a different part of the feature space. Similar to a linear regression model, the average values of the input features (e.g., E, h, and L features) may be given as input to the XGBoost model.

In yet another example, a hybrid approach may be used. A pre-trained CNN backbone (e.g., ResNet, MobileNet, and the like) may be used to help extract image features leading to a predictive performance in downstream tasks. For example, CNN 208 in FIG. 2 may be used to extract image features. Providing a representative frame of each video may give more information to the prediction model in terms of image features to improve prediction performance. A representative frame (e.g., one or more of frames 206 in FIG.

2) of each video may be selected as an input image. In contrast to a typical CNN-based approach, where a prediction model may learn to predict the bitrate and time directly based on the provided representative image of the video, in a hybrid model, a latent vector may be extracted using one of the penultimate layers (e.g., a fully connected layer with 16 neurons) of a trained CNN model (e.g., CNN 208). Given a model trained for predicting bitrate and encoding times, a penultimate fully connected layer (e.g., in CNN 208) may contain rich information about the image relevant for the job. Each element of the latent vector thus obtained would include an appropriate feature that can be appended to the E, h, and L features to derive the hybrid features. In this example, XGBoost or another gradient boosting regression algorithm also may be used to fit the hybrid features and obtain a predictive model.

In an example, UHD (e.g., 2160 p) 24 fps sequences from a VCD dataset may be encoded using x265 v3.5 (e.g., available at https://www.videolan.org/developers/x265.html) with the veryslow, medium and ultrafast presets using Constant Quantization Parameter (CQP) rate-control mode with QP values of 22, 27, 32, and 37 according to the HECV Common Test Conditions (CTC). Encodings may be carried out on various instances (e.g., Amazon Elastic Computing (e.g., EC2) instances), including c5.2xlarge and c5.4xlarge, which deliver cost-effective high performance at a low price per compute ration for running advanced compute-intensive workloads. In some examples, the E, h, and L features may be extracted using VCA open source software with X86 SIMD optimization and eight CPU threads. k-means clustering may be performed to generate clusters of sequences (e.g., 5 clusters) where 80% of the sequences form each cluster are selected into a training set and remaining sequences into a test set to ensure sufficient diversity within the training set and the test set. Averages of each of the features in a selected feature combination over a sequence of 120 frames may be chosen to present in the input data. In some examples, for linear regression model or a gradient boosting regression model, input sizes for each data point may be three—i.e., [E, h, L]. For a hybrid version, the input size may be nineteen—i.e., E, h, L, and latent vectors from CNN. Minimum and maximum values of each feature over a dataset may be calculated to perform normalization for each data point using a min-max approach. This may ensure that all features possess a value between 0 and 1, ensuring the sheer magnitude of values does not wrongly influence the model. Random seeds may be fixed throughout to ensure reproducibility.

To evaluate accuracy of models described herein in predicting an encoding bitrate, a ground truth bitrate ($b_G$) may be determined manually for each QP for each video segment. An average error rate of the bitrate prediction ($e_b$) for N sample points may be determined by the relative error of the prediction (in logarithm scale) with respect to the ground truth. In an example, the average error rate of the bitrate prediction may be defined as:

$$e_b = \frac{1}{N}\sum_{n=0}^{N-1}\left|\frac{b_{G_n} - \hat{b_n}}{b_{G_n}}\right|$$

where $\hat{b}$ represents the predicted bitrate. Similarly, accuracy of models described herein in predicting encoding time predictions also may be determined. The ground truth encoding time ($t_G$) may be determined manually for each QP for each video segment. An average error rate (in logarithm scale) of the encoding time prediction ($e_t$) may be determined as:

$$e_t = \frac{1}{N}\sum_{n=0}^{N-1}\left|\frac{t_{G_n} - \hat{t_n}}{t_{G_n}}\right|$$

where $\hat{b}$ represents the predicted encoding time and N denotes a number of sample points. In addition to the error rate (e.g., $e_b$ and $e_t$), $R^2$ scores may be calculated for both encoding bitrate prediction and encoding time prediction to estimate an objective measure of the deviation of the predicted values with respect to the ground truth values.

Experimental Results

In experiments conducted using methods for video encoding complexity prediction methods described herein, it has been shown that as encoding preset gets faster, or QP value gets higher, error rates for encoding bitrate $e_b$ decreases and the $R^2$ score increases. Results further indicate that as the encoding preset gets slower, $e_t$ decreases and $R^2$ score increases. Results also show that as QP value increases, $e_t$ decreases and $R^2$ score increases. In some examples, extracted features such as E, h, and L may have a relatively greater importance overall for bitrate predictions than for encoding time predictions, with h being the most relevant feature, followed by L, and then E.

Video complexity feature extraction (e.g., to extract E, h, and L features) for a segment may take less than one second, and as little as approximately 0.2-0.4 seconds. An average time to predict each data point for linear regression may be approximately 40-50 ns or less. An average time to predict each data point for a gradient boosting regression algorithm (e.g., XGBoost) may be approximately 70-80 µs or less. An average time to predict each data point for hybrid models may be approximately 100-102 ms or less. Deploying a gradient boosting regression model (e.g., in an XGBoost model, a hybrid model, and the like) improves prediction accuracy significantly, as it can efficiently model non-linearity of features. It is observed that prediction accuracy increases as the QP value decreases and/or the encoding preset is slower.

Figure 4A:
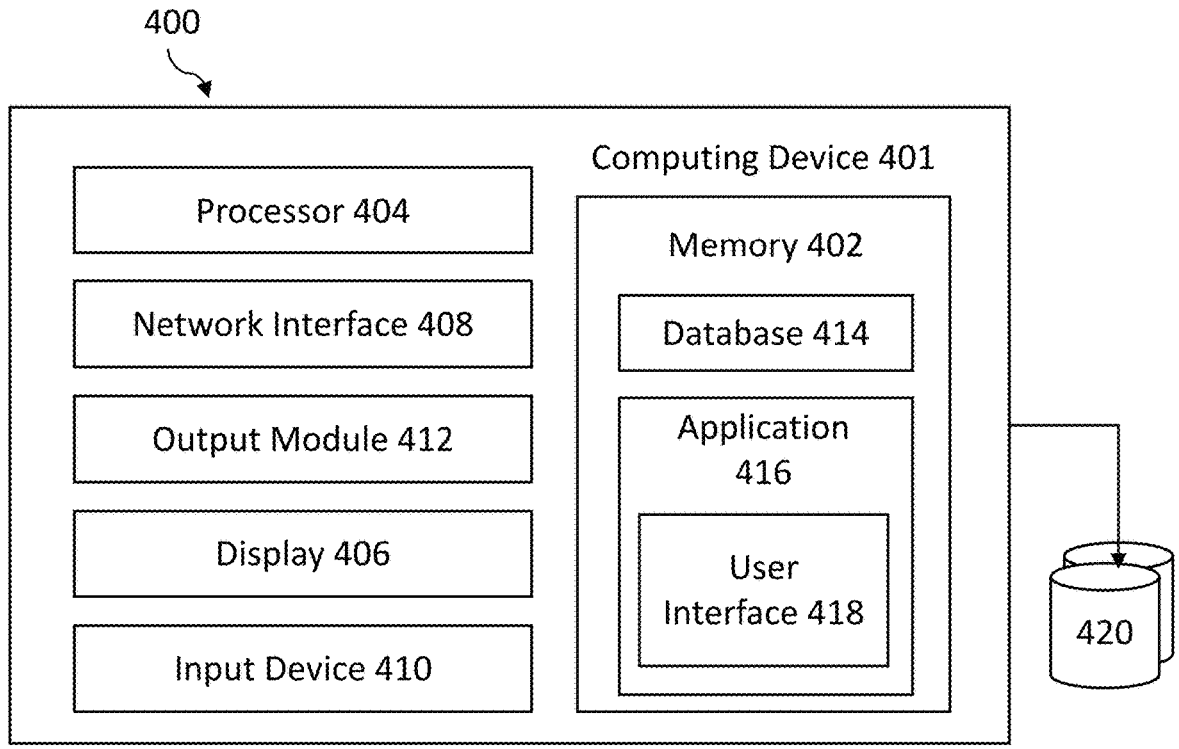
FIG. 4A is a simplified block diagram of an exemplary computing system configured to perform steps of the method illustrated in FIG. 5 and to implement the system illustrated in FIG. 2, in accordance with one or more embodiments.
Figure 4B:
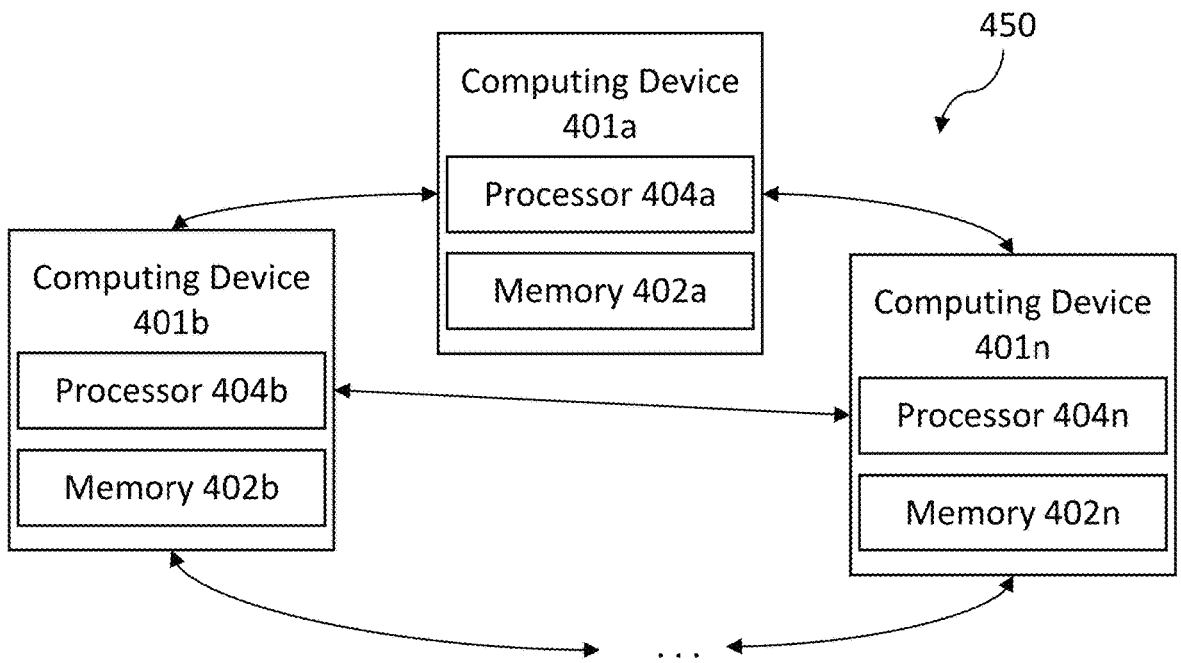
FIG. 4B is a simplified block diagram of an exemplary distributed computing system implemented by a plurality of the computing devices, in accordance with one or more embodiments.
Figure 5:
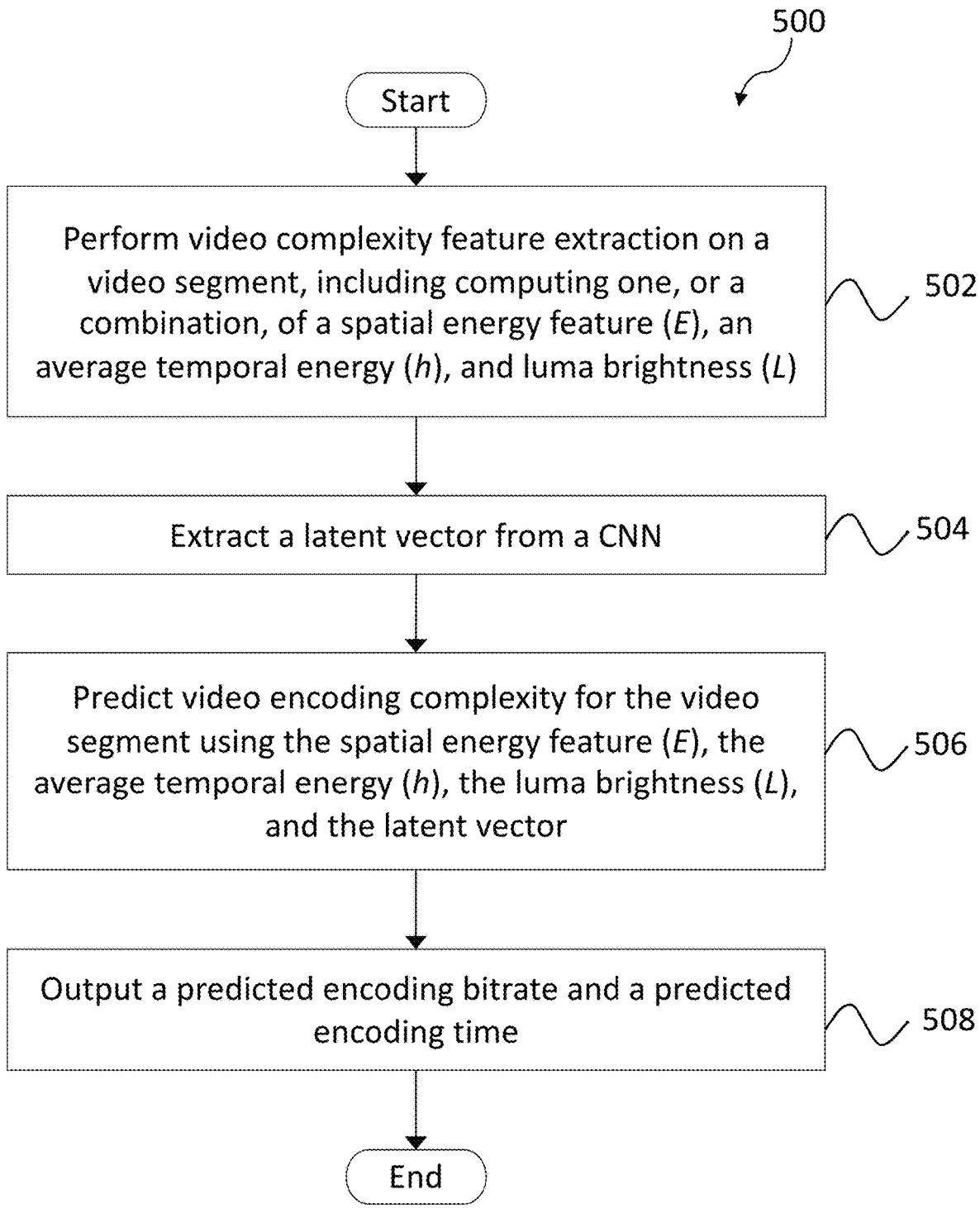
FIG. 5 is a flow diagram illustrating a method for video encoding complexity prediction, in accordance with one or more embodiments.

FIG. 4A is a simplified block diagram of an exemplary computing system configured to perform steps of the method illustrated in FIG. 5 and to implement the system illustrated in FIG. 2, in accordance with one or more embodiments. In one embodiment, computing system 400 may include computing device 401 and storage system 420. Storage system 420 may comprise a plurality of repositories and/or other forms of data storage, and it also may be in communication with computing device 401. In another embodiment, storage system 420, which may comprise a plurality of repositories, may be housed in one or more of computing device 401. In some examples, storage system 420 may store video data (e.g., frames, resolutions, and the like), neural networks (e.g., trained), codecs, features, instructions, programs, and other various types of information as described herein. This information may be retrieved or otherwise accessed by one or more computing devices, such as computing device 401, in order to perform some or all of the features described herein. Storage system 420 may comprise any type of computer storage, such as a hard-drive, memory card, ROM, RAM, DVD, CD-ROM, write-capable, and read-only memories. In addition, storage system 420 may include a distributed storage system where data is stored on a plurality of different storage devices, which may be physically located at the same or different geographic locations (e.g., in a distributed computing system such as system 450 in FIG. 4B). Storage system 420 may be networked to computing device 401 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 401 also may include a memory 402. Memory 402 may comprise a storage system configured to store a database 414 and an application 416. Application 416 may include instructions which, when executed by a processor 404, cause computing device 401 to perform various steps and/or functions, as described herein. Application 416 further includes instructions for generating a user interface 418 (e.g., graphical user interface (GUI)). Database 414 may store various algorithms and/or data, including neural networks and data regarding video data and feature maps, among other types of data. Memory 402 may include any non-transitory computer-readable storage medium for storing data and/or software that is executable by processor 404, and/or any other medium which may be used to store information that may be accessed by processor 404 to control the operation of computing device 401.

Computing device 401 may further include a display 406, a network interface 408, an input device 410, and/or an output module 412. Display 406 may be any display device by means of which computing device 401 may output and/or display data. Network interface 408 may be configured to connect to a network using any of the wired and wireless short range communication protocols described above, as well as a cellular data network, a satellite network, free space optical network and/or the Internet. Input device 410 may be a mouse, keyboard, touch screen, voice interface, and/or any or other hand-held controller or device or interface by means of which a user may interact with computing device 401. Output module 412 may be a bus, port, and/or other interface by means of which computing device 401 may connect to and/or output data to other devices and/or peripherals.

In one embodiment, computing device 401 is a data center or other control facility (e.g., configured to run a distributed computing system as described herein), and may communicate with a media playback device. As described herein, system 400, and particularly computing device 401, may be used for implementing CAPS, as described herein. Various configurations of system 400 are envisioned, and various steps and/or functions of the processes described herein may be shared among the various devices of system 400 or may be assigned to specific devices.

FIG. 4B is a simplified block diagram of an exemplary distributed computing system implemented by a plurality of the computing devices, in accordance with one or more embodiments. System 450 may comprise two or more computing devices 401a-n. In some examples, each of 401a-n may comprise one or more of processors 404a-n, respectively, and one or more of memory 402a-n, respectively. Processors 404a-n may function similarly to processor 404 in FIG. 4A, as described above. Memory 402a-n may function similarly to memory 402 in FIG. 4A, as described above.

FIG. 5 is a flow diagram illustrating a method for video encoding complexity prediction, in accordance with one or more embodiments. Method 500 begins with performing video complexity feature extraction on a video segment at step 502, including computing one, or a combination, of a spatial energy feature (E), an average temporal energy (h), and a luma brightness (L). In some examples, features extracted may be low-complexity frame-based features, as described herein, representing a spatial complexity, a temporal complexity, and brightness. In some examples, a latent vector also may be extracted from a CNN at step 504, for example with Mobile Net as backend to obtain additional features from a representative frame of the video segment to assist with the prediction process. A video encoding complexity may be predicted for the video segment using the spatial energy feature (E), the average temporal energy (h), the luma brightness (L), and the latent vector at step 506. A predicted encoding bitrate and a predicted encoding time may be output at step 508 by a video encoding complexity prediction model, as described herein. In some examples, the video encoding complexity prediction model may further receive and use as inputs one, or a combination, of encoder (i.e., codec) type, target QP, CPU resource, and other relevant information.

In some examples, the predicted encoding bitrate and the predicted encoding time may be provided to an encoding infrastructure (e.g., encoding scheduler) for improved fast encoding completion with improved load balance. For example, an encoding scheduler may use one or both of the predicted encoding bitrate and the predicted encoding time to optimize a schedule of encodings.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for predicting video encoding complexity comprising:
    performing video complexity feature extraction on a video segment, wherein a plurality of low-complexity frame-based features are extracted, the plurality of low-complexity frame-based features comprising a Discrete Cosine Transform-energy-based feature;
    extracting a latent vector from a frame of the video segment using a convolutional neural network (CNN), an element of the latent vector including an appropriate feature that can be appended to the Discrete Cosine Transform-energy-based feature;
    predicting video encoding complexity for the video segment using the plurality of low-complexity frame-based features and the latent vector, a predicted video encoding complexity comprising an encoding bitrate and an encoding time; and
    outputting a predicted encoding bitrate and a predicted encoding time.

2. The method of claim 1, wherein the plurality of low-complexity frame-based features includes one, or a combination, of a spatial energy feature (E), an average temporal energy (h), and a luma brightness (L).

3. The method of claim 1, wherein predicting video encoding complexity comprises implementing a linear regression model.

4. The method of claim 1, wherein predicting video encoding complexity comprises implementing a gradient boosting regression model.

5. The method of claim 1, wherein predicting video encoding complexity comprises implementing a hybrid model using the CNN.

6. The method of claim 1, wherein the latent vector is further used as input for predicting video encoding complexity.

7. The method of claim 1, wherein the CNN comprises a fully connected layer as a penultimate layer.

8. The method of claim 1, further comprising providing one or both of the predicted encoding bitrate and the predicted encoding time to an encoding infrastructure.

9. The method of claim 1, further comprising optimizing a schedule of encodings using one or both of the predicted encoding bitrate and the predicted encoding time.

10. The method of claim 1, further comprising providing an encoder type as input for predicting video encoding complexity, the encoder type indicating a codec.

11. The method of claim 1, further comprising providing a target quantization parameter (QP) as input for predicting video encoding complexity.

12. The method of claim 1, further comprising providing a central processing unit (CPU) resource as input for predicting video encoding complexity.

13. A distributed computing system comprising:
    a distributed database configured to store a plurality of video segments, a convolutional neural network (CNN), a plurality of bitrate ladders, and a codec; and
    one or more processors configured to:
        perform video complexity feature extraction on a video segment, wherein a plurality of low-complexity frame-based features are extracted, the plurality of low-complexity frame-based features comprising a Discrete Cosine Transform-energy-based feature;
        extract a latent vector from a frame of the video segment using a convolutional neural network (CNN), an element of the latent vector including an appropriate feature that can be appended to the Discrete Cosine Transform-energy-based feature;
        predict video encoding complexity for the video segment using the plurality of low-complexity frame-based features and the latent vector, a predicted video encoding complexity comprising an encoding bitrate and an encoding time; and
        output a predicted encoding bitrate and a predicted encoding time.

14. The distributed computing system of claim 13, wherein the CNN comprises a fully connected layer as a penultimate layer.

* * * * *